United States Patent
Liu

(10) Patent No.: US 6,776,939 B2
(45) Date of Patent: Aug. 17, 2004

(54) METHOD FOR MAKING AN EXPANDED SHOE SOLE

(76) Inventor: Kun-Chung Liu, No. 5, Alley 9, Lane 212, San-Feng Rd., Hou-Li Hsiang, Taichung Hsien (TW)

( * ) Notice: Subject to any disclaimer, the term of this patent is extended or adjusted under 35 U.S.C. 154(b) by 136 days.

(21) Appl. No.: 10/213,867

(22) Filed: Aug. 5, 2002

(65) Prior Publication Data

US 2004/0021241 A1 Feb. 5, 2004

(51) Int. Cl.⁷ .............................................. B29C 44/06
(52) U.S. Cl. ...................... 264/45.1; 156/79; 264/46.4; 264/51; 264/271.1
(58) Field of Search ........................... 156/79; 264/45.1, 264/46.4, 51, 271.1; 36/44

(56) References Cited

U.S. PATENT DOCUMENTS

| | | | |
|---|---|---|---|
| 4,296,053 A | * 10/1981 | Doerer et al. ............... | 264/421 |
| 4,581,187 A | * 4/1986 | Sullivan et al. ............. | 264/46.4 |
| 4,674,204 A | * 6/1987 | Sullivan et al. ............. | 36/44 |
| 4,823,483 A | * 4/1989 | Chapnick ..................... | 36/43 |
| 5,547,620 A | * 8/1996 | Guiotto ....................... | 264/46.4 |
| 5,560,877 A | * 10/1996 | Yung et al. .................. | 264/51 |
| 5,814,254 A | * 9/1998 | Bisconti ....................... | 264/46.4 |
| 6,129,798 A | * 10/2000 | Yang ............................ | 156/79 |
| 6,540,864 B1 | * 4/2003 | Chi .............................. | 156/245 |

* cited by examiner

Primary Examiner—Allan R. Kuhns
(74) Attorney, Agent, or Firm—Knobbe, Martens, Olson & Bear, LLP

(57) ABSTRACT

A method for making an expanded shoe sole includes the steps of (a) molding a first foamable material to form an unexpanded sole blank, and cooling the unexpanded sole blank to harden the unexpanded sole blank, (b) positioning the hardened unexpanded sole blank on a first mold, (c) heating a second mold to a molding temperature, (d) positioning assembly of the hardened unexpanded sole blank and the first mold in the second mold, (d) filling a second foamable material in the second mold prior to expansion and cross-linking of the hardened unexpanded sole blank, and (e) thermally molding the second foamable material and the hardened unexpanded sole blank in the second mold.

3 Claims, 5 Drawing Sheets

Molding a first foamable material to form a hardened unexpanded sole blank

↓

Positioning the unexpanded sole blank on a son mold

↓

Heating a parent mold to a molding temperature

↓

Positioning the assembly of the unexpanded sole blank and the son mold in the parent mold

↓

Filling a second foamable material in the parent mold

↓

Thermally molding the second foamable material and the unexpanded sole blank in the parent mold

FIG. 3

METHOD FOR MAKING AN EXPANDED SHOE SOLE

BACKGROUND OF THE INVENTION

1. Field of the Invention

This invention relates to a method for making an expanded shoe sole, more particularly to a method for making an expanded shoe sole that includes a first sole part and a second sole part which is inlaid in the first sole part.

2. Description of the Related Art

FIGS. 1 and 2 illustrate how a shoe sole 6 is prepared in a mold 3 according to a conventional method. The shoe sole 6 includes a first sole part 61 and a second sole part 62 that is inlaid in the first sole part 61. The method includes the steps of placing an unexpanded sole blank 1 in the mold 3 which is heated to a molding temperature, and filling and thermally molding a foamable material in the mold 3. In order to prevent warping of the unexpanded sole blank 1 by virtue of reaction for expansion and cross-linking during the aforesaid molding process, a limiting member 2, which is in the form of an unexpanded sole blank 1 by means of ribs 404 formed on an inner wall of the mold 3. The limiting member 2 melts in the mold 3 during the molding process, and cooperates with the foamable material to form the first sole part 61. The unexpanded sole blank 1 undergoes the reaction for expansion and cross-linking to form the second sole art 62. The aforesaid conventional method is disadvantageous in that, since the unexpanded sole blank 1 is in direct contact with the mold 3, which is at the molding temperature, the temperature of the unexpanded sole blank 1 will be rapidly raised to the molding temperature, and the unexpanded sole blank 1 will warp by virtue of the reaction for expansion and cross-linking prior to the filling of the foamable material in the mold 3, which, in turn, results in dismounting of the limiting member 2 from the ribs 404 and poor quality of the resulting shoe sole 6. Moreover, since the ribs 404 are at the molding temperature, the operator may be injured by the ribs 404 during the mounting of the limiting member 2 thereon.

SUMMARY OF THE INVENTION

Therefore, the object of the present invention is to provide a method for making an expanded shoe sole that is capable of overcoming the aforementioned drawbacks of the prior art.

According to the present invention, there is provided a method for making an expanded shoe sole that includes a first sole part and a second sole part which is inlaid in the first sole part. The method comprises the steps of: (a) molding a first foamable material to form an unexpanded sole blank, and cooling the unexpanded sole blank to harden the unexpanded sole blank; (b) positioning the hardened unexpanded sole blank on a first mold; (c) heating a second mold to a molding temperature; (d) positioning assembly of the hardened unexpanded sole blank and the first mold in a mold cavity in the second mold heated in the step (c) in such a manner that the hardened unexpanded sole blank is separated from the second mold by the first mold and that the first mold increases the conductive resistance for heat to transfer from the second mold to the hardened unexpanded sole blank; (d) filling a second foamable material to surround the hardened unexpanded sole blank on the first mold in the mold cavity prior to expansion and cross-linking of the hardened unexpanded sole blank; and (e) thermally molding the second foamable material and the hardened unexpanded sole blank in the second mold at the molding temperature to permit the second foamable material and the hardened unexpanded sole blank to undergo reaction for expansion and cross-linking to form the first and second sole parts of the expanded shoe sole, respectively.

BRIEF DESCRIPTION OF THE DRAWINGS

In the drawings which illustrate an embodiment of the invention,

FIG. 3 is a flow diagram illustrating consecutive steps of a method embodying this invention for making an expanded shoe sole;

DETAILED DESCRIPTION OF THE PREFERRED EMBODIMENT

Figure 1:
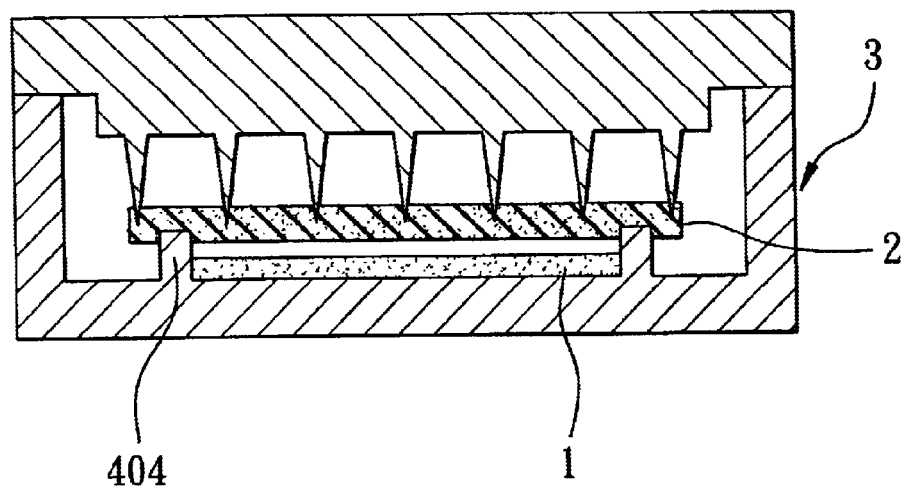
FIG. 1 is a sectional view to illustrate how a shoe sole is prepared according to a conventional method.
Figure 2:
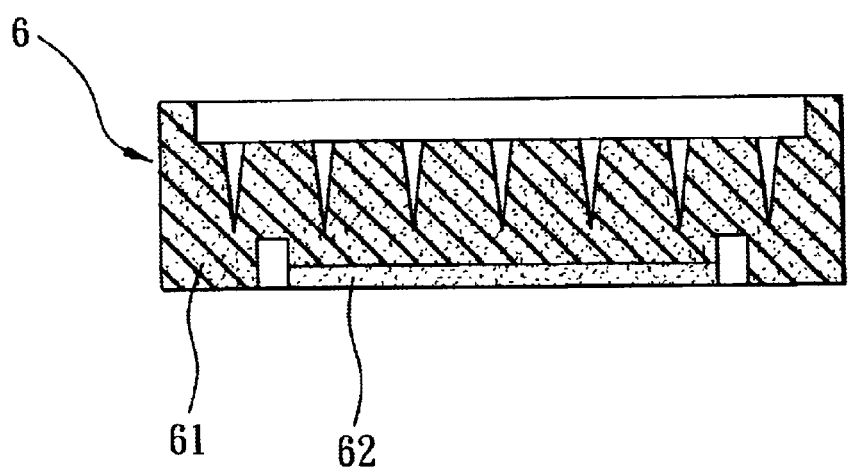
FIG. 2 is a sectional view of the shoe sole prepared by the conventional method.

For the sake of clarity, like elements are denoted by the same reference numerals throughout the disclosure.

Figure 5:
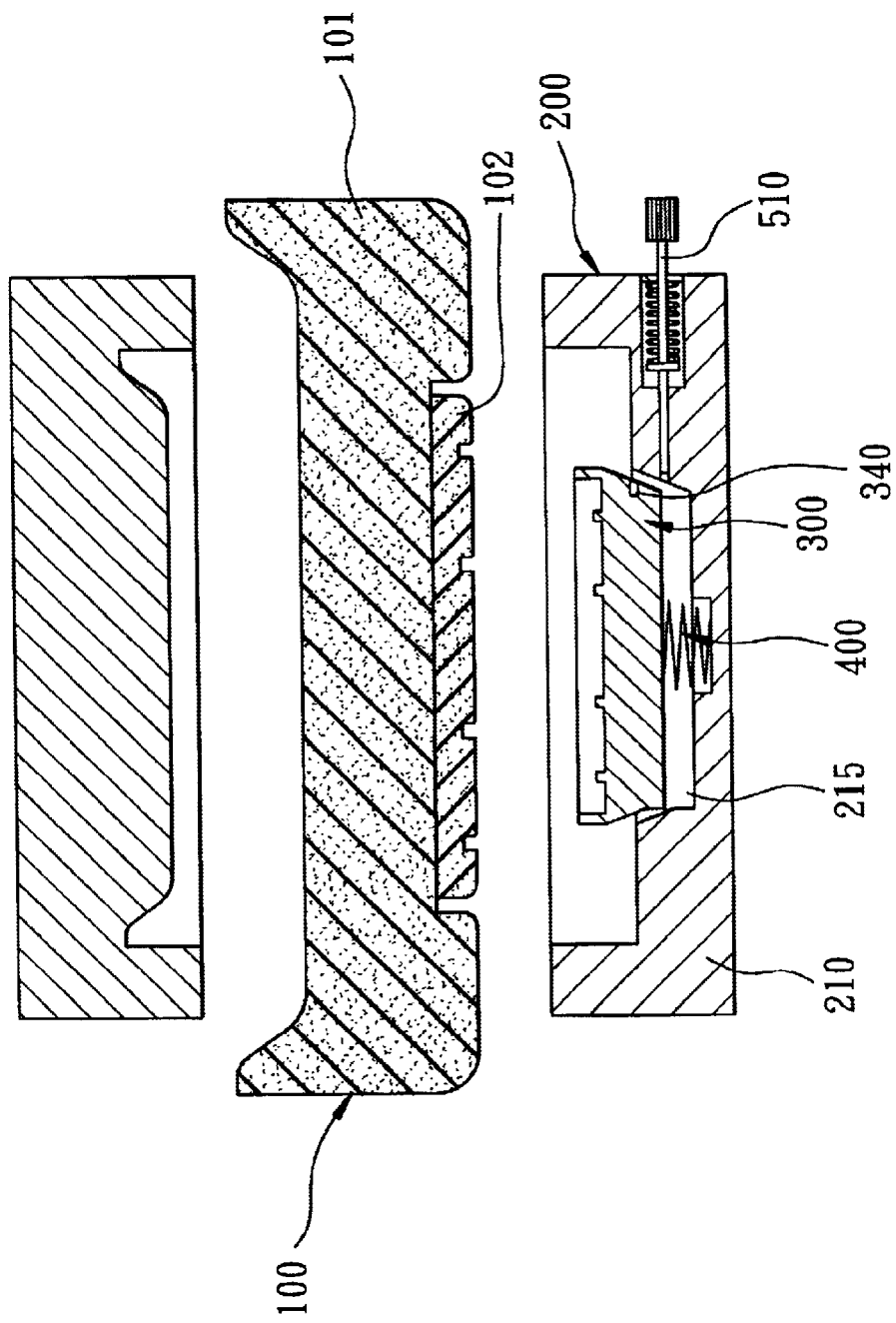
FIG. 5 is an exploded sectional view to illustrate how the expanded shoe sole is removed from the mold according to the method of this invention.

FIG. 3 shows consecutive steps of a method embodying this invention for making an expanded shoe sole 100 that includes a first sole part 101 and a second sole part 102 inlaid in the first sole part 101 (see FIG. 5).

Figure 4:
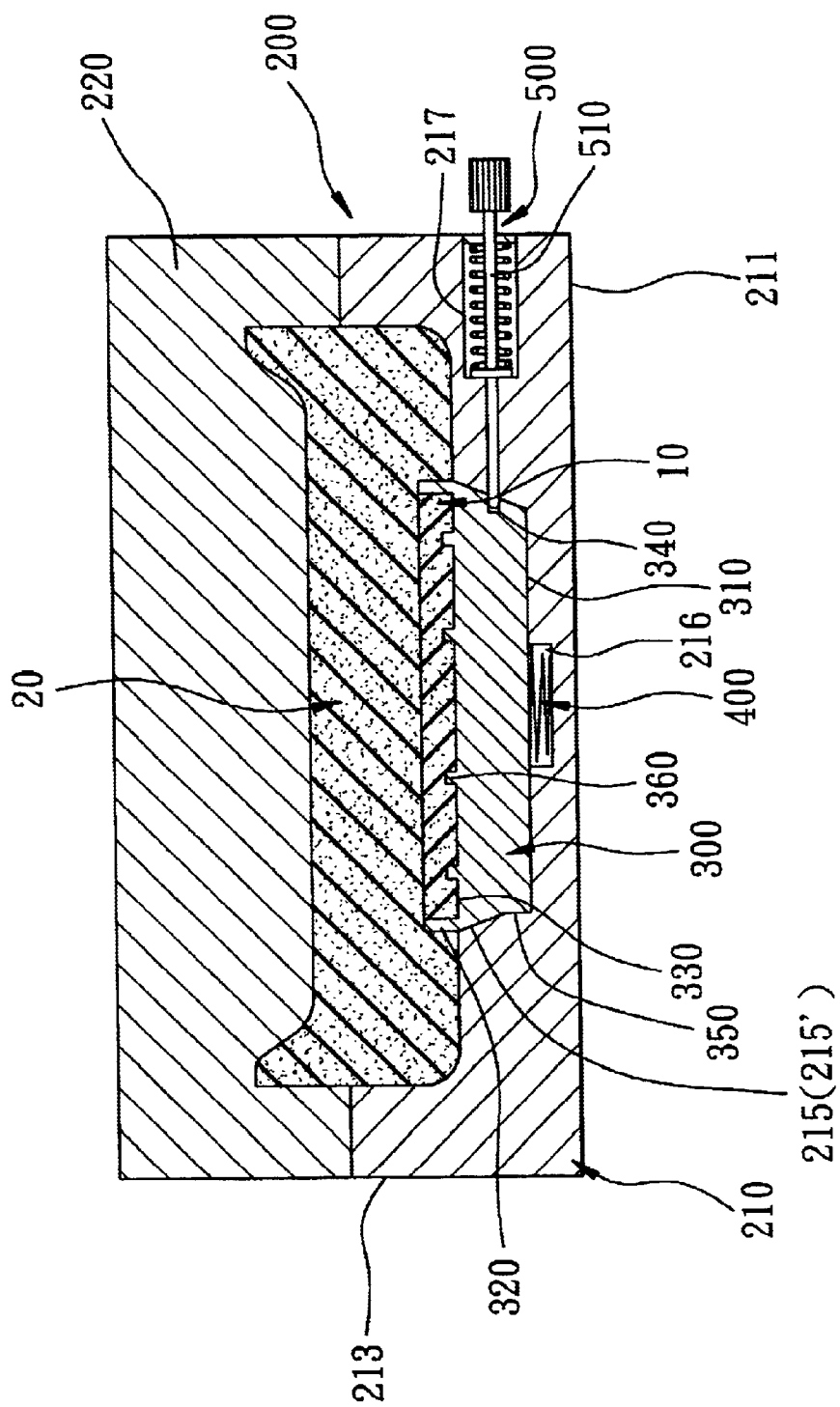
FIG. 4 is a sectional view to illustrate how the expanded shoe sole is prepared by using a first or son mold in a second or parent mold according to the method of this invention.

Referring to FIGS. 4 and 5, in combination with FIG. 3, the method includes the steps of: (a) molding a first foamable material to form an unexpanded sole blank 10, and cooling the unexpanded sole blank 10 to harden the unexpanded sole blank 10; (b) positioning the hardened unexpanded sole blank 10 on a first or son mold 300 which is in the form of a block body; (c) heating a second or parent mold 200 to a molding temperature; (d) positioning the assembly of the hardened unexpanded sole blank 10 and the first mold 300 in a mold cavity in the second mold 200 heated in the step (c) in such a manner that the hardened unexpanded sole blank 10 is separated from the second mold 200 by the first mold 200 and that the first mold 300 increases the conductive resistance for heat to transfer from the second mold 200 to the hardened unexpanded sole blank 10; (d) filling a second foamable material to surround the hardened unexpanded sole blank 10 on the first mold 300 in the mold cavity prior to expansion and cross-linking of the hardened unexpanded sole blank 10; and (e) thermally molding the second foamable material and the hardened unexpanded sole blank 10 in the second mold 200 at the molding temperature to permit the second foamable material and the hardened unexpanded sole blank 10 to undergo reaction for expansion and cross-linking to form the first and second sole parts 101, 102 of the expanded shoe sole 100, respectively.

The first and second foamable materials are made from a molding composition that contains ethylene-vinyl acetate copolymer. Preferably, the temperatures of the hardened unexpanded sole blank 10 and the first mold 300 are maintained at room temperature before placing in the second mold 200. The molding temperature is in a range of from 150 to 180° C.

The second mold 200 includes a male mold half 220, and a female mold half 210 complementary to the male mold half 220 and having a peripheral wall of U-shaped cross-section that cooperates with the male mold half 220 to define the mold cavity therebetween. The peripheral wall has a laterally extending base wall portion 211 and an upright wall portion 213 that extends uprightly from the base wall portion 211 in a transverse direction relative to the base wall portion 211. The base wall portion 211 is indented inwardly to form a positioning recess 215 that is in spatial communication with the mold cavity and that is confined by a recess-confining wall 215'. The recess-confining wall 215' is indented inwardly to form a spring-retaining groove 216 that is in spatial communication with the positioning recess 215. The first mold 300 has an outer surface 350 that conforms to the recess-confining wall 215', is snugly fitted in the positioning recess 215, and has an upper flange 320 that projects into the mold cavity, and an upper surface 330 that is confined by the upper flange 320 and that confines a portion of a bottom side of the mold cavity. A plurality of positioning ribs 360 are formed on the upper surface 330 of the first mold 300 for mounting of the unexpanded sole blank 10 thereon. The first mold 300 has a bottom surface 310 that is opposite to the upper surface 330. An urging member 400 is disposed in the spring-retaining groove 216, and abuts against the bottom surface 310 of the first mold 300 for urging the first mold 300 to move outwardly of the positioning recess 215. A retaining member 500 releasably engages the first mold 300 so as to retain the first mold 300 in the positioning recess 215 during the molding operation, and is operable to disengage from the first mold 300, thereby permitting outward movement of the first mold 300 from the positioning recess 215 via urging action of the urging member 400. The first mold 300 is formed with a retaining hole 340. The base wall portion 211 of the peripheral wall of the female mold half 210 is formed with a channel 217 that is laterally aligned and that is in spatial communication with the retaining hole 340. The retaining member 500 includes a spring-biased pin 510 that extends into the channel 217 and that is movable between a locking position, in which, the pin 510 is urged to move into and engage the retaining hole 340, thereby retaining the first mold 300 in the positioning recess 215, and an unlocking position, in which, the pin 510 is moved out of and disengages from the retaining hole 340, thereby permitting removal of the first mold 300 from the positioning recess 215.

Figure 6:
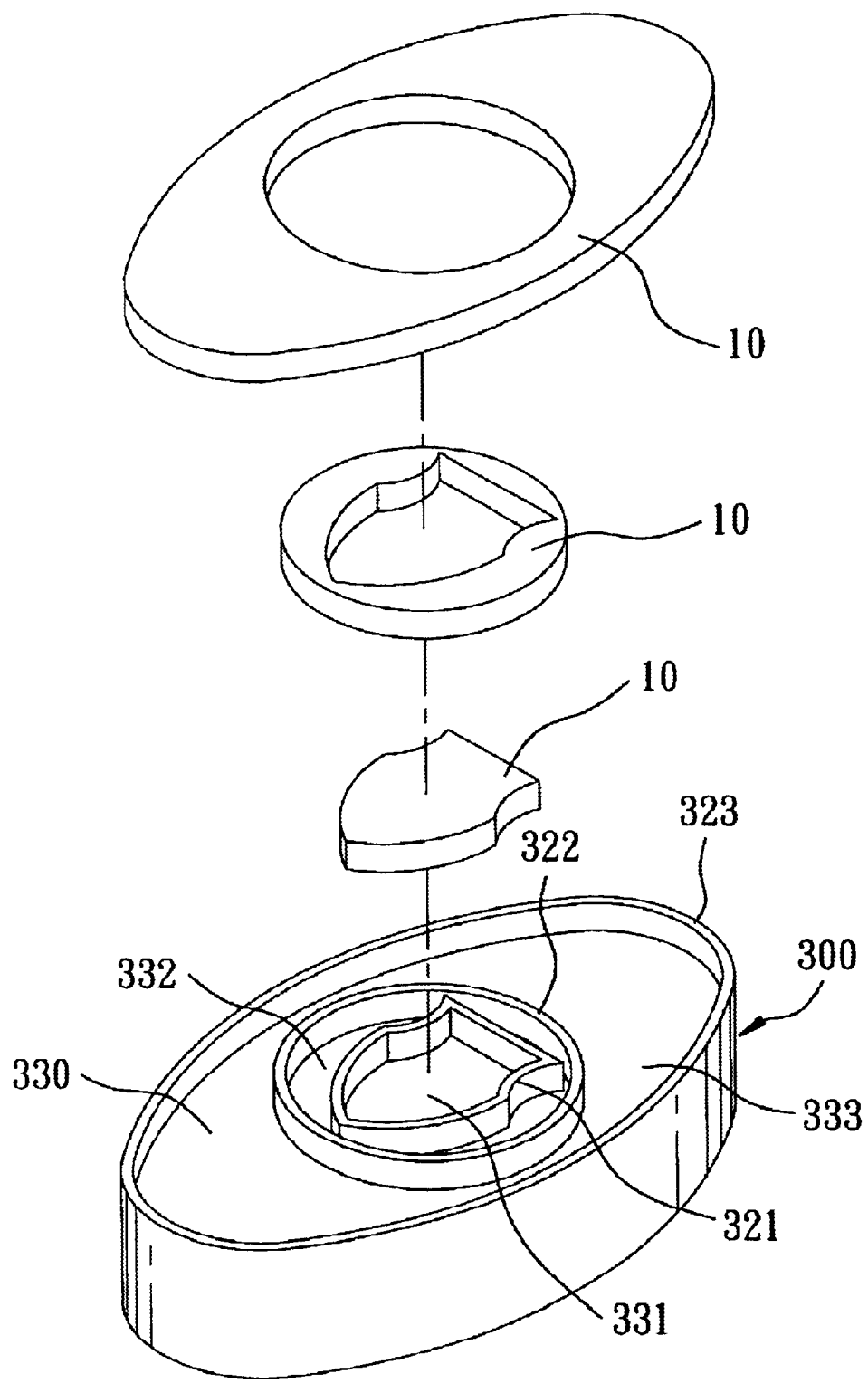
FIG. 6 is an exploded perspective view of a first mold modified from that shown in FIG. 4.

FIG. 6 illustrates another first mold 300 modified from that shown in FIG. 4. The first mold 300 includes a plurality of flanges 321, 322, 323 projecting from the upper surface 330 of the first mold 300 for forming a plurality of recesses 331, 332, 333 which can receive a plurality of the unexpanded sole blanks 10 for forming a plurality of second sole parts inlaid in the first sole part of the expanded shoe sole 100. The first and second sole parts can have different colors so as to enhance the appearance of the expanded shoe sole.

Since the placement of the unexpanded sole blank 10 in the second mold 200 involves the use of the first mold 300, the potential risk of being injured by the second mold 200 can be avoided. Moreover, since the first mold 300 separates the unexpanded sole blank 10 from the second mold 200, the rate of heat flow from the second mold 200 to the unexpanded sole blank 10 via heat conduction through the first mold 300 can be greatly reduced, thereby avoiding expansion and cross-linking of the unexpanded sole blank 10 prior to the filling of the second foamable material in the mold cavity.

With the invention thus explained, it is apparent that various modifications and variations can be made without departing from the spirit of the present invention. It is therefore intended that the invention be limited only as recited in the appended claims.

I claim:

1. A method for making an expanded shoe sole that includes a first sole part and a second sole part which is inlaid in the first sole part, the method comprising the steps of:
   (a) molding a first foamable material to form an unexpanded sole blank, and cooling the unexpanded sole blank to harden the unexpanded sole blank;
   (b) positioning the hardened unexpanded sole blank on a first mold;
   (c) heating a second mold to a molding temperature;
   (d) positioning assembly of the hardened unexpanded sole blank and the first mold in a mold cavity in the second mold heated in the step (c) in such a manner that the hardened unexpanded sole blank is separated from the second mold by the first mold and that the first mold increases the conductive resistance for heat to transfer from the second mold to the hardened unexpanded sole blank;
   (d) filling a second foamable material to surround the hardened unexpanded sole blank on the first mold in the mold cavity prior to expansion and cross-linking of the hardened unexpanded sole blank; and
   (e) thermally molding the second foamable material and the hardened unexpanded sole blank in the second mold at the molding temperature to permit the second foamable material and the hardened unexpanded sole blank to undergo reaction for expansion and cross-linking to form the first and second sole parts of the expanded shoe sole, respectively.

2. The method of claim 1, wherein the first and second foamable materials are made from a molding composition that contains ethylene-vinyl acetate copolymer.

3. The method of claim 2, wherein the temperatures of the hardened unexpanded sole blank and the first mold are maintained at room temperature before placing in the second mold, the molding temperature being in a range of from 150 to 180° C.

* * * * *

UNITED STATES PATENT AND TRADEMARK OFFICE
CERTIFICATE OF CORRECTION

PATENT NO. : 6,776,939 B2  
DATED : August 17, 2004  
INVENTOR(S) : Liu

It is certified that error appears in the above-identified patent and that said Letters Patent is hereby corrected as shown below:

<u>Column 4,</u>
Line 27, after "positioning" insert -- an --.
Line 35, delete "(d)" and insert -- (e) --.
Line 39, delete "(e)" and insert -- (f) --.

Signed and Sealed this

Twenty-ninth Day of November, 2005

JON W. DUDAS
*Director of the United States Patent and Trademark Office*